(12) United States Patent
Bernhard

(10) Patent No.: US 12,350,595 B2
(45) Date of Patent: Jul. 8, 2025

(54) CHILDREN'S LEARNING GAME

(71) Applicant: Melissa D. Bernhard, Las Vegas, NV (US)

(72) Inventor: Melissa D. Bernhard, Las Vegas, NV (US)

(*) Notice: Subject to any disclaimer, the term of this patent is extended or adjusted under 35 U.S.C. 154(b) by 243 days.

(21) Appl. No.: 15/473,486

(22) Filed: Mar. 29, 2017

(65) Prior Publication Data

US 2018/0280788 A1    Oct. 4, 2018

(51) Int. Cl.
| | | |
|---|---|---|
| *G09B 19/22* | (2006.01) | |
| *A63F 1/04* | (2006.01) | |
| *A63F 3/00* | (2006.01) | |
| *A63F 3/04* | (2006.01) | |
| *A63F 9/18* | (2006.01) | |
| *G09B 1/06* | (2006.01) | |
| *G09B 3/02* | (2006.01) | |
| *G09B 17/00* | (2006.01) | |
| *G09B 19/00* | (2006.01) | |
| *A63H 3/14* | (2006.01) | |

(52) U.S. Cl.
CPC ............. *A63F 3/0402* (2013.01); *A63F 1/04* (2013.01); *A63F 3/0023* (2013.01); *A63F 3/00261* (2013.01); *A63F 3/0478* (2013.01); *A63F 9/18* (2013.01); *G09B 1/06* (2013.01); *G09B 3/02* (2013.01); *G09B 17/00* (2013.01); *G09B 19/00* (2013.01); *G09B 19/22* (2013.01); *A63F 2003/00233* (2013.01); *A63F 2003/00239* (2013.01); *A63F 2003/00406* (2013.01); *A63F 2003/00936* (2013.01); *A63F 2003/00943* (2013.01); *A63F 2003/00981* (2013.01); *A63F 2003/0489* (2013.01); *A63H 3/14* (2013.01)

(58) Field of Classification Search
CPC ............. G09B 1/02; G09B 1/06; G09B 19/22
USPC ................ 434/128, 129, 347–349, 363, 364; 273/281, 282.1, 285–287
See application file for complete search history.

(56) References Cited

U.S. PATENT DOCUMENTS 2,100,421 A * 11/1937 Wupper .............. A63F 3/00574
235/90
2,794,641 A * 6/1957 Baker ................. A63F 3/00075
248/472

(Continued)

*Primary Examiner* — Kurt Fernstrom

(57) ABSTRACT

A learning game and apparatus that focuses on improving the mastery of object permanence, language acquisition, humor development, and complex imaginative play abilities in young children. Primarily, the present invention is designed for early learners (infants, toddlers, and preschoolers), as no reading is required. The game invention and apparatus comprises a game board, game cards, accessory box and accessories, and has many playstyle variations to accommodate play by young children. The present invention facilitates learning through human interactive peek-a-boo play. The goal of the game is to find the peek-a-boo "surprise" by engaging in dialogue via game cards attached to a vertical game board. Certain variations of the game can be played with one designated game leader and one or more game players. Younger children are encouraged to play with older children as well as take on the role of game leader, as an opposite method of playing. Additionally, the present invention may also provide a means to teach young children sign language.

13 Claims, 17 Drawing Sheets

(56) References Cited

U.S. PATENT DOCUMENTS

| | | | | |
|---|---|---|---|---|
| 3,178,185 A * | 4/1965 | Ardis | A63F 3/00261 | 116/223 |
| 3,506,267 A * | 4/1970 | Taillie | A63F 3/00 | 273/146 |
| 3,732,629 A * | 5/1973 | Spitzner | A63F 3/06 | 273/270 |
| 4,055,345 A * | 10/1977 | Havlik | A63F 3/00574 | 273/260 |
| 4,277,067 A * | 7/1981 | Gettleman | A63F 3/00075 | 273/271 |
| 4,381,112 A * | 4/1983 | Dupuy | A63F 3/00094 | 273/239 |
| 4,943,054 A * | 7/1990 | Palou | A63F 9/18 | 434/347 |
| 5,154,428 A * | 10/1992 | Woolhouse | A63F 3/00075 | 273/265 |
| 5,533,902 A * | 7/1996 | Miller | G09B 19/04 | 434/428 |
| 5,720,464 A * | 2/1998 | Meinscher | A47F 7/146 | 248/447 |
| 5,769,639 A * | 6/1998 | Foster | G09B 1/06 | 434/159 |
| 6,286,835 B1 * | 9/2001 | Quercetti | A47B 97/08 | 273/285 |
| 6,428,003 B1 * | 8/2002 | Fondin | A63F 3/00094 | 273/241 |
| 6,581,933 B1 * | 6/2003 | Zivan | A63F 3/00214 | 273/287 |
| 6,626,675 B1 * | 9/2003 | Webber | G09B 1/02 | 434/156 |
| 7,896,652 B1 * | 3/2011 | Van Balveren | G09B 19/00 | 434/236 |
| 8,205,367 B2 * | 6/2012 | Markos | H04N 21/440263 | 40/454 |
| 8,267,697 B2 * | 9/2012 | Druon | A63F 11/0074 | 434/430 |
| 8,419,440 B2 * | 4/2013 | Leahy | G09B 1/06 | 434/430 |
| 8,556,264 B2 * | 10/2013 | Benedict, III | A63F 3/0023 | 273/265 |
| 10,463,951 B1 * | 11/2019 | Su | A63F 9/0073 | |
| 2004/0080109 A1 * | 4/2004 | Dudar | A63F 3/0023 | 273/285 |
| 2004/0178578 A1 * | 9/2004 | Weiss | A63F 3/00119 | 273/240 |

\* cited by examiner

Copyright 2017 Cooper Coons, Ltd., all right reserved.

Copyright 2017 Cooper Coons, Ltd., all right reserved.

Copyright 2017 Cooper Coons, Ltd., all right reserved.

Copyright 2017 Cooper Coons, Ltd. , all right reserved.

CHILDREN'S LEARNING GAME

FIELD OF THE INVENTION

The present invention relates to children's learning games. More specifically the invention relates to an interactive children's learning game intended to aid young children in mastering the concept of object permanence usually between six months to two years of the child's age, language and vocabulary development usually between six months to five years, humor development usually between six months to five years, and imaginative play usually one year and older. The present invention achieves these goals through recognition of images, ideation and "peek-a-boo" style interactive game play.

This present invention claims the benefit of a prior Provisional Application filed on Mar. 30, 2016 under U.S. Application No. 62/315,478 under specific provisions 35 USC 119(e), 120, 121, 365(c), or 386(c).

BACKGROUND

There is a wide variety of activities designed to promote learning for varying ages of children within this industry. It is a common goal that young children are exposed to a variety of sensory stimuli to develop and practice vital life skills. Of the varying methods for teaching young children these skills, games are the most prevalent method to convey information and develop necessary skills. Multiple designs and methods for attempting to devise a game that entertains as well as informs have been attempted to greater or lesser success. Some games are meant to be played alone while others promote interaction with other players. This patent is designed in according with the latter. However, all the methods previously attempted fail to overcome certain deficiencies and take advantage of contemporary advances in the field of child learning.

Young children conventionally learn developmental skills while in school or through teaching of their parents or care givers. However, there are many individuals who have difficulty being engaged or simply understanding the methodologies currently used in traditional schools. Professionals, parents, and teachers often prematurely conclude that a child simply has a learning disability due to said child's lack of development. However, other in education attest to the difficulty of the teaching styles and methods within schools. Various teaching methods, procedures and plans have been developed to engage certain children in new and creative ways. The education industry is full of games to aid children and infants in developing language, auditory, sensory, and perception skills. Research has found that utilizing a game or the gamification of education is a viable means to increase the chances a certain child will respond to the curriculum and content and actually learn.

However, many of the educational games on the market are inadequate on many levels. Often, these games may be too complicated or the inverse as too simple, or employ fantastical characters or themes or complex reading strategies such that the child is more distracted by the game itself and the instructional content is not retained. Regarding other instances in this field of invention, the games may simply be boring to the child and not attract enough of a child's attention at the onset and thus losing the window of attention a child is willing to provide.

Object permanence is the understanding that objects continue to exist even when they cannot be observed (seen, heard, touched, smelled or sensed in any way). Jean Piaget, the Swiss clinical psychologist known for his pioneering work in the field of developmental psychology, argued object permanence is one of an infant's most important accomplishments. Peek-a-boo is a prime example of an object permanence test. A child who is mastering object permanence will find quick appearances and disappearances amusing, and will play the game of peek-a-boo again and again.

Humor is also critical to a young child's cognitive development. Teachers of young children have always been aware of the key importance of play for learning, Humor is intrinsically a form of intellectual play, and an example would be to play with ideas. Research shows that social and intellectual development among young children can be enhanced and enriched when the children are exposed to the regular, structured, appropriate use of humor by parents and teachers.

Extremely young children primarily learn with auditory use of language as opposed to reading script. As those skilled in the art can appreciate incorporating humor and other entertainment elements improves retention of learned skills and encourages individuals to play the game again.

Card games of varying configurations are a popular gaming method designed to teach children certain subject matter. For example, Prillerman U.S. Pat. No. 6,457,716 discloses a card game aimed at teaching geography, history, and health via a plurality of double-sided cards. Images or text of the relevant information are displayed on both sides of a plurality of cards. Players then proceed to hold a plurality of the cards in their hand and attempt to match the relevant subject matter such as the state to its capitol. However, this card game fails to enable extremely young children to participate by requiring a player to hold its own cards. It is therefore an object of the present invention to permit children as young as six months old to participate.

In another example, Greenberg U.S. Pat. No. 6,447,300 discloses a card game aimed at teaching mathematical concepts through the depiction of numbers, words, and arithmetic symbols. In an attempt to make the information more appealing to children, varying graphical representations are displayed on the cards, with animals in the shape of numbers. A child then places a card beginning with the number of the result of the arithmetic operation displayed on the prior card. In much the same way, this card game fails to enable extremely young children to participate. Additionally, this card game lacks active engagement through adequate entertainment. It is therefore an object of the present invention to provide an engaging and fun game experience.

Often, certain games rely on a simple gameplay method where certain information is matched with information already on display. For example, McLeod U.S. Pat. No. 6,099,318. Corresponding pairs of cards are used in which one card has a text description of an item and its sister card to be matched has a graphical representation of the word. A player then proceeds to successively eliminate subsequent pairs until no more cards are displayed. The drawbacks to this simple gameplay method are evident. Once such basic skills have been mastered, the content of the game has been exhausted and young players become disinterested. It is an object of the present invention to create an interactive experience between players more particularly described below increasing the replay value the game.

As such, there is a continuing unmet need for an improved child's learning game invention to aid young children in their language and other developmental skills. The present invention should be fun and playable for children of varying ages, children with developmental disabilities, and adults. The game invention should advantageously provide means to introduce learning dialog to the players, as well as provide other fun and entertaining aspects.

SUMMARY

This present invention provides a solution to the shortcomings in prior art and helps a child master the concept of object permanence, language and vocabulary development, humor development, and complex imaginative play abilities through the engagement of a child's learning game apparatus. In general, a present invention is designed to aid infants, toddlers and preschoolers in their language and humor development, and is ideal for young children as no reading is required. The present invention may also provide a means to teach infants and young children sign language. Still further, in a particularly certain embodiment the game invention is easily employable by children with developmental disabilities due to the limited need to manipulate playing pieces. The game invention is also easily employable by grandparents or older adults who wish to interact with young children, yet may not have the physical ability to interact on the floor. Advantageously, certain embodiments of the game can be played with one game leader and one game player, however, there is no limit to the number of players that can play, and children of varying ages can play together. Moreover, it is conceivable that a child as young as four years can act as a game leader with younger game players. Or a young child may switch roles with the game leader during the game.

Generally, play proceeds as the players answer questions and dialog is promoted via game cards. The game cards are removable and engage with or attached to a vertically disposed game board such that the fronts of the game cards can be exposed or displayed to the players. The card fronts include, but are not limited to, depictions or graphic illustrations, photographs, or any one or a combination of objects and/or themes, such as alphabet letters, numbers and counting, colors, shapes, sounds, sensory and tactile, opposites, emotions, faces, people, animals, toys, foods, structures, vehicles, clothing, home and family, school, doctor, farm, nature, city, what's missing or doesn't belong or other such learning themes to promote a dialog. The rear sides of the game cards face away from the players and are only visually accessible to a designated game leader. The cards therefore are double sided and may include the aforementioned depictions on one or both sides.

Game play proceeds further as players identify an image on a card, and the game leader asks questions and dialogs with the player(s) about what is depicted on the card. In a certain embodiment the questions can be provided by pre-written questions located on the card backs or other questions card. In other game embodiments, the questions may be up to a game leader's discretion. In all modes, the leader designates one or a plurality of cards as the 'surprise card' such as by marking or otherwise providing an indication of that card on the rear face of the displayed cards, or on the rear side of the game board, which again is only visible by them. Alternatively, the leaders randomly choose one or a plurality of 'surprise' cards at their own discretion. The surprise card is not revealed to the players, however the leader tells the player(s) that behind one or a plurality of the cards is a surprise. Through identifying the images correctly and answering questions, the player(s) can continue to choose cards from the display hoping to find the 'surprise' card. When a surprise card is chosen or essentially at any time during the game (and any number of times) the leader, at his or her discretion, opts to give a "peek-a-boo" surprise to the player(s). The leader may "check" behind the card in question to see if the surprise is there to further add to the game ambiance. The leader then hides his or her face behind the card display board, dons an accessory such as a funny nose, hat, eyeglasses, ears, mustache, or the like, and pops out from the top or either side of the board. In other game embodiments, the leader may utilize a puppet and at his or her discretion, may don the puppet with an accessory. In another game embodiment, the use of an accessory is at the leader's discretion, as the object (leader or puppet) appearing and reappearing from behind the game board may be sufficient to elicit laughter from the player(s). The leader preferably says "peek-a-boo" or other verbal cue. Game play is repeated until leader and/or player(s) are tired of playing or all game cards have been discussed.

With respect to the above description, the present invention is not limited in its application to the details of construction and to the arrangement of the components in the following description or illustrated in the drawings. The invention herein described is capable of other embodiments and of being practiced and carried out in various ways which will be obvious to those skilled in the art. Also, it is to be understood that the phraseology and terminology employed herein are for the purpose of description and should not be regarded as limiting.

As used in the claims to describe the various inventive aspects and embodiments, "comprising" means including, but not limited to, whatever follows the word "comprising". Thus, use of the term "comprising" indicates that the listed elements are required or mandatory, but that other elements are optional and may or may not be present. By "consisting of" is meant including, and limited to, whatever follows the phrase "consisting of". Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they affect the activity or action of the listed elements.

This summary is not intended to identify key features or essential features of the claimed subject matter, nor is it intended to be used as an aid in determining the scope of the claimed subject matter.

Additional features and advantages of exemplary implementations of the present disclosure will be set forth below, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF DRAWINGS AND FIGURES

Figure 4A:
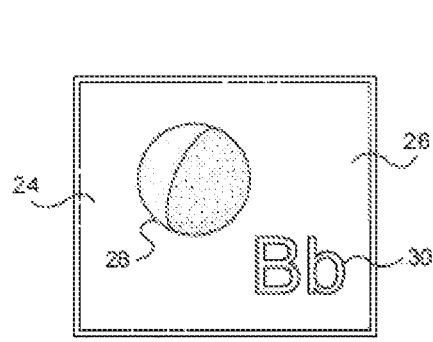
FIG. 4A depicts a front view of a certain game card having a graphic depiction and related alphanumeric character indicia displayed on the front surface.
Figure 4B:
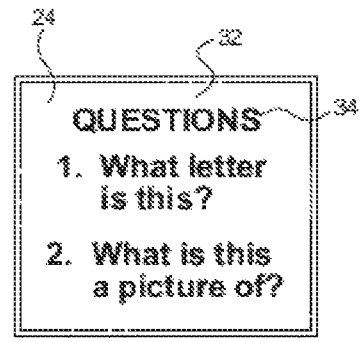
FIG. 4B depicts a rear view of a certain game card of the rear surface of the card of FIG. 4A illustrating a list of possible discussion questions.
Figure 4C:
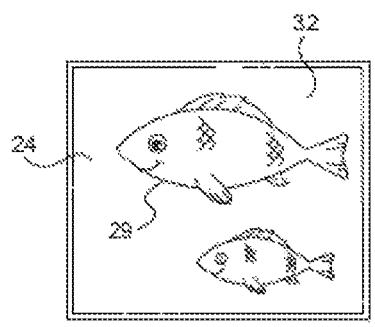

FIG. 4cC depicts a rear view of another certain game card of the rear surface of the card of FIG. 4A also having a graphic depictions such that the card is reversible during play.

Figure 5A:
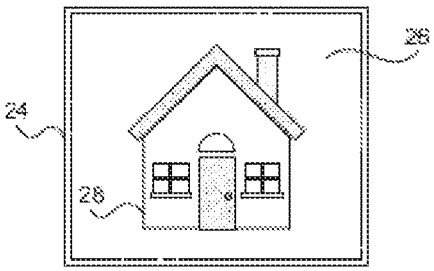

FIG. 5A depicts a front view of another certain game card having a graphic depictions disposed on the front surface.

Figure 5B:
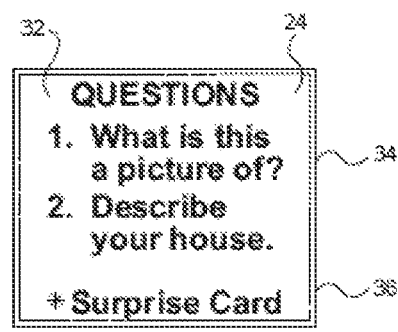

FIG. 5B depicts a rear view of the rear surface of a certain game card of FIG. 5A illustrating a list of possible discussion questions and an indication that the particular card is a surprise card.

Figure 6:
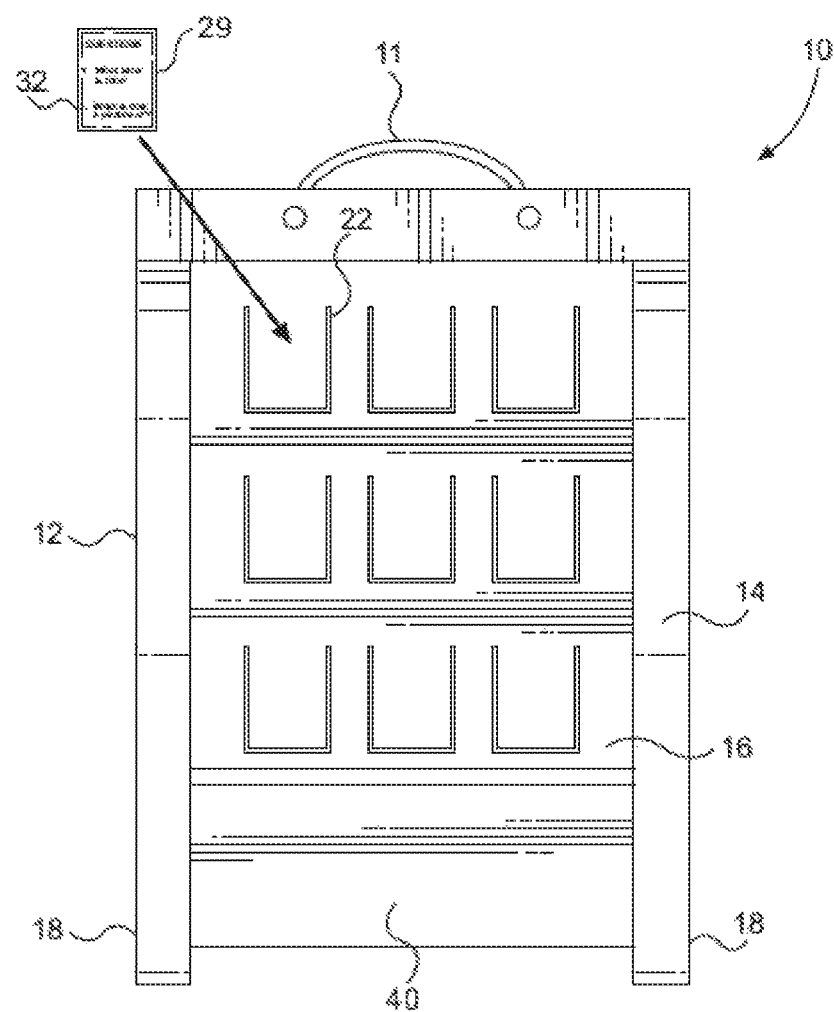

FIG. 6 depicts this game invention in an as used position illustrating the engagement of a game card onto a receiving slot of the rear side of the game board.

Figure 7:
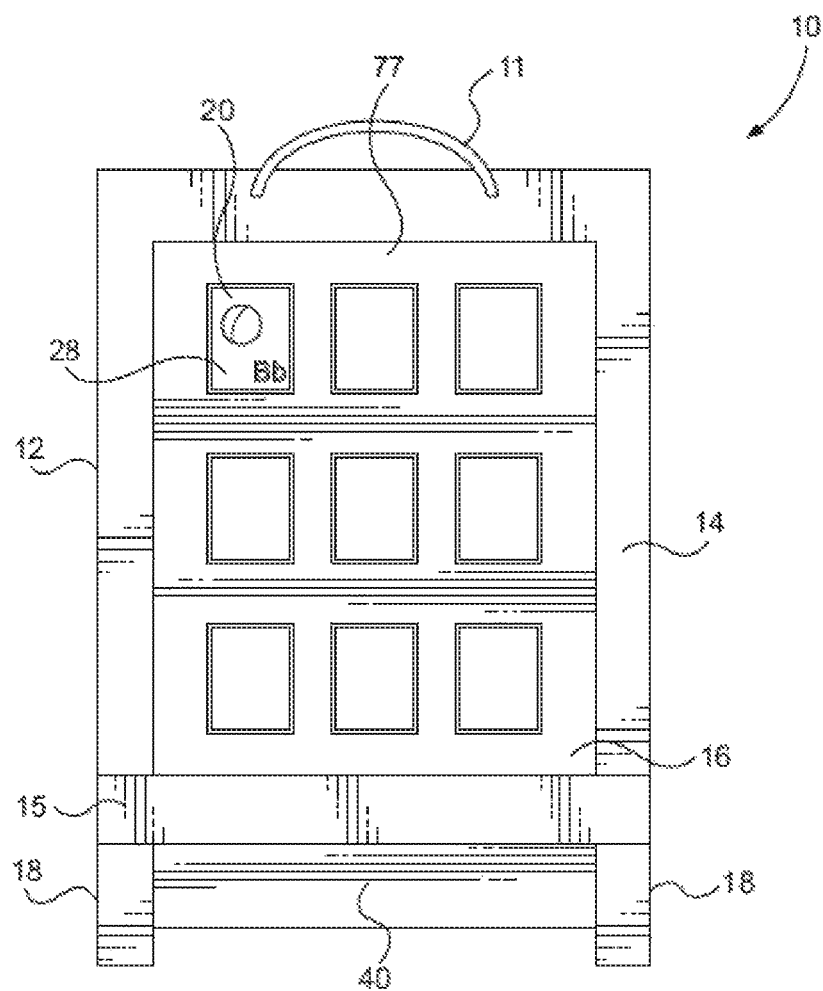

FIG. 7 depicts a front view of this game invention in the as used mode with at least one game card in the engaged positioned on the game board.

Figure 8:
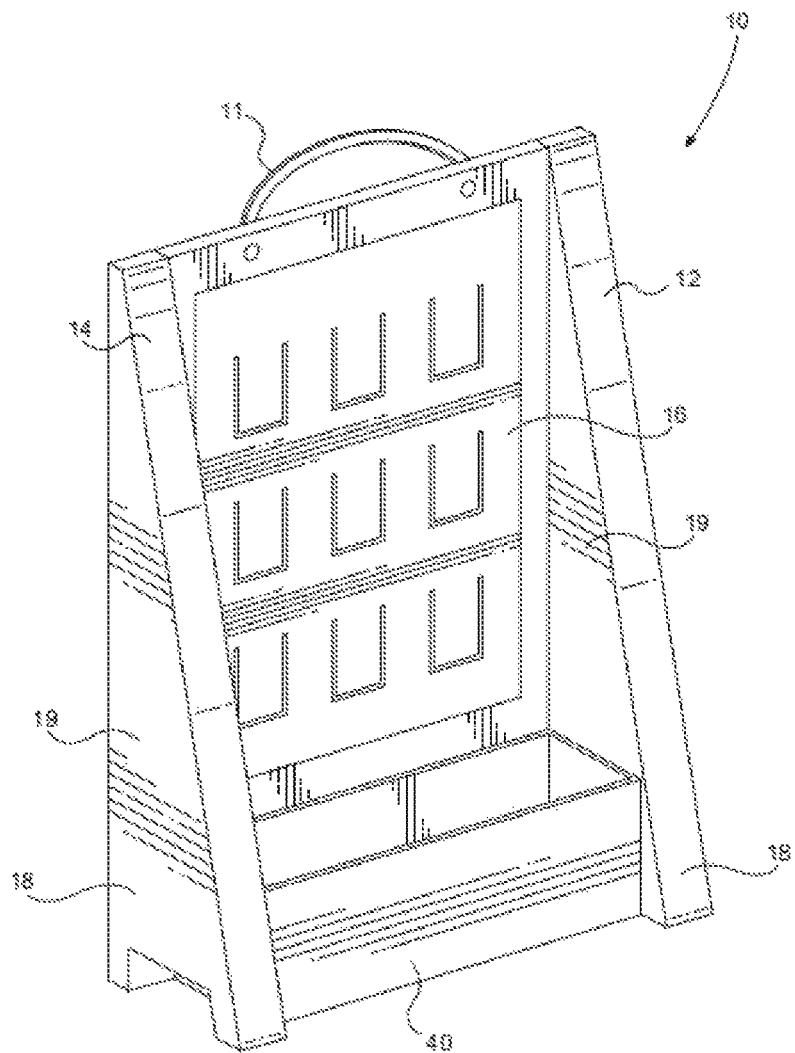

FIG. 8 depicts a ¾ perspective view of this game invention showing a particularly preferred built-in container or box component of an embodiment.

Figure 9:
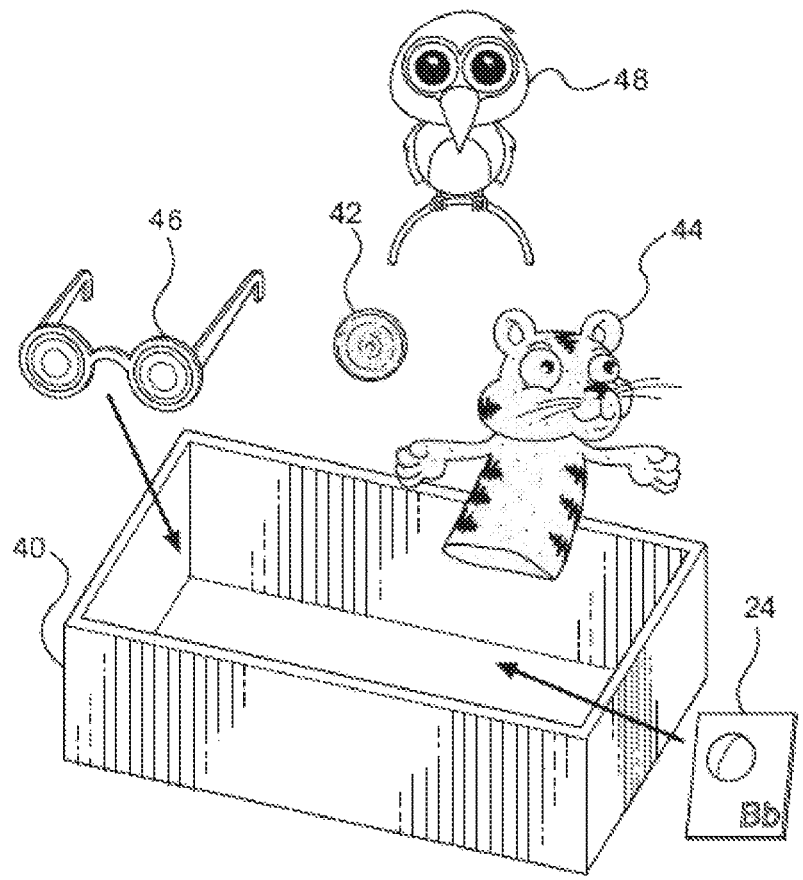

FIG. 9 depicts the particularly preferred container or box component of FIG. 8 which is intended to hold a plurality of accessories such as eyeglasses, puppets or the like which the game leader can employ as a surprise to the players, and a plurality of game cards.

Figure 10:
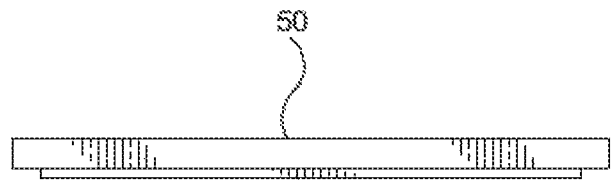

FIG. 10 depicts a side view of a particularly preferred lid component to the particularly preferred container or box component of FIG. 8 and of this present invention.

Figure 11:
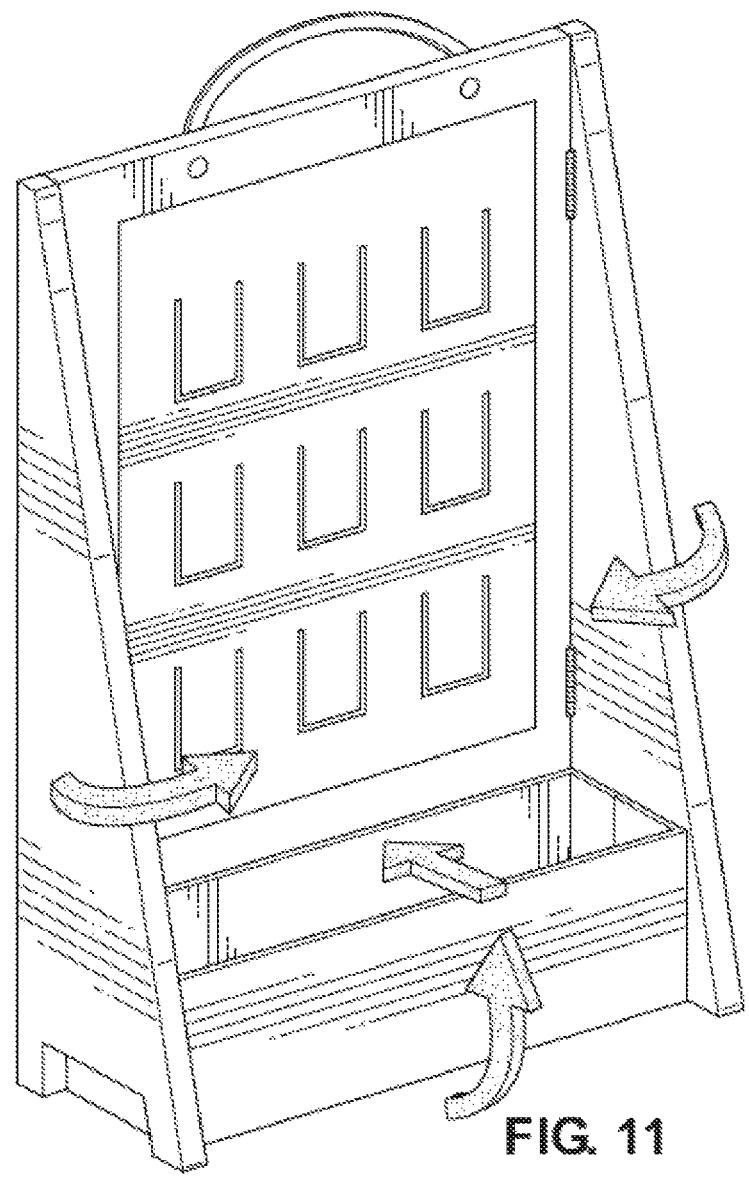

FIG. 11 depicts a ¾ perspective view of a game board and container box with hinges and collapsible panels illustrated as options to reduce the size of a game board for storage and/or transport.

Figure 12:
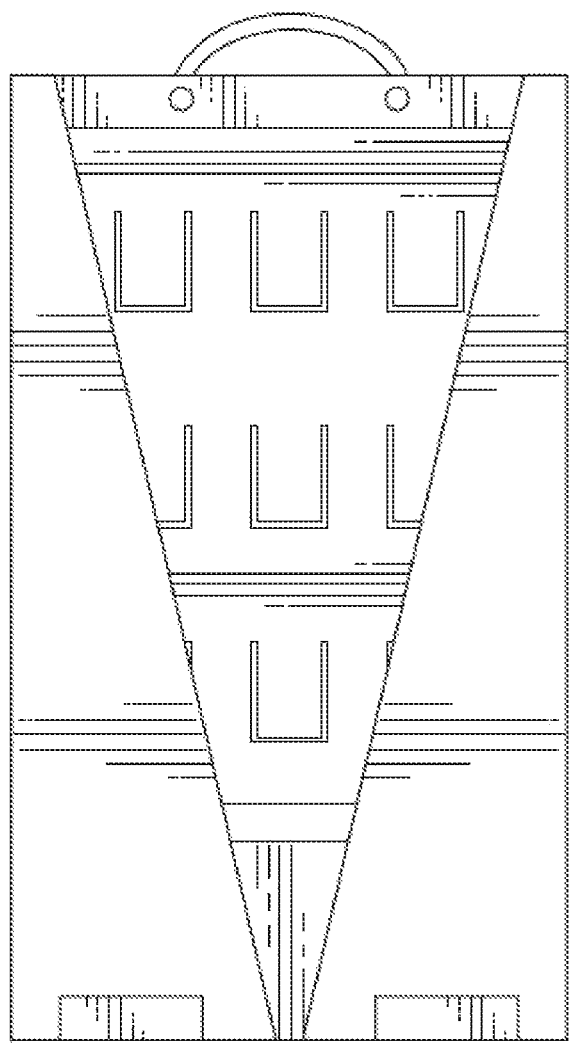

FIG. 12 depicts a rear view of a game board and container box in its collapsed mode for storage and/or transport.

Figure 13:
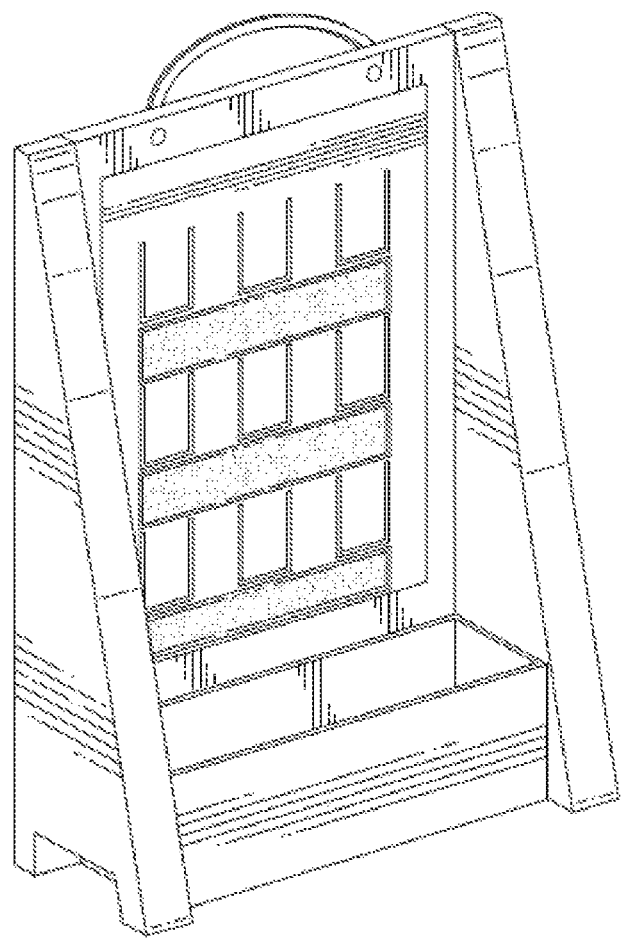

FIG. 13 depicts a rear view of a game board and container box constructed as a single unit that will not be foldable but remain in a static position.

Figure 14:
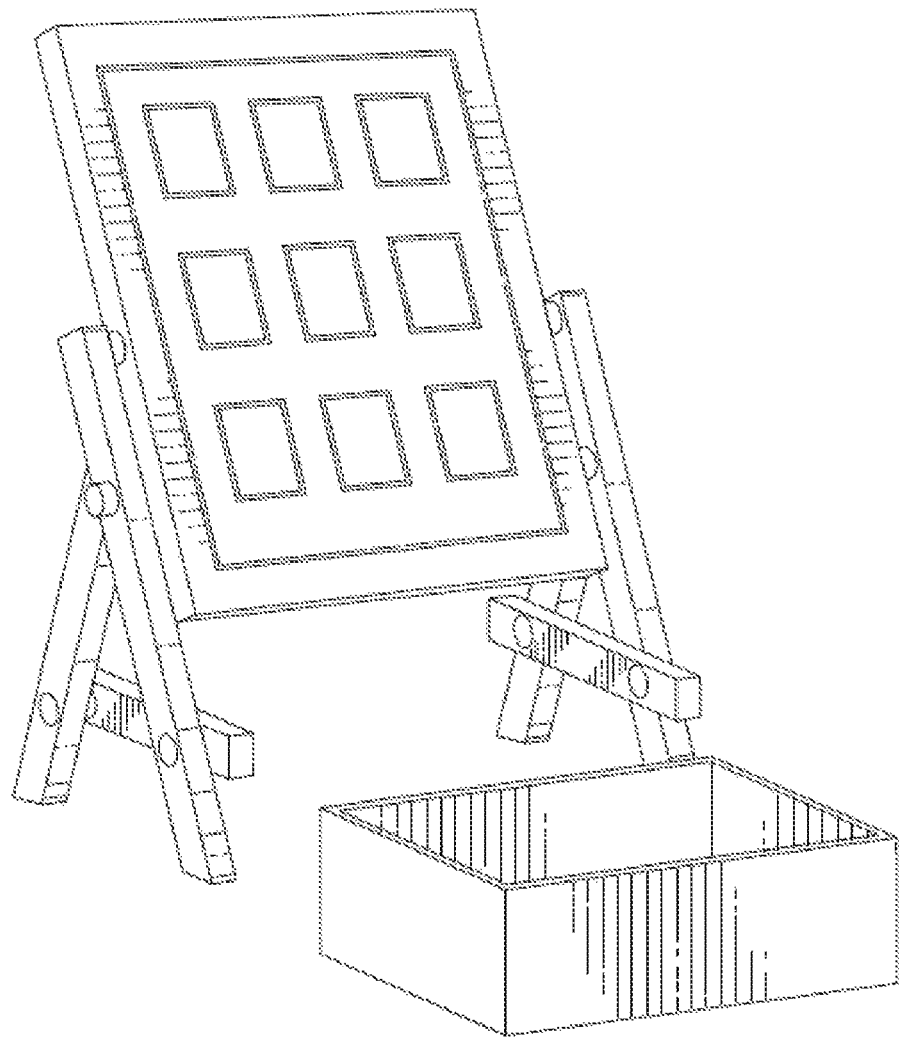

FIG. 14 depicts a front view of a game board and detached container box with adjustable legs to change and configure different angles of operation of the game board frame.

Figure 15:
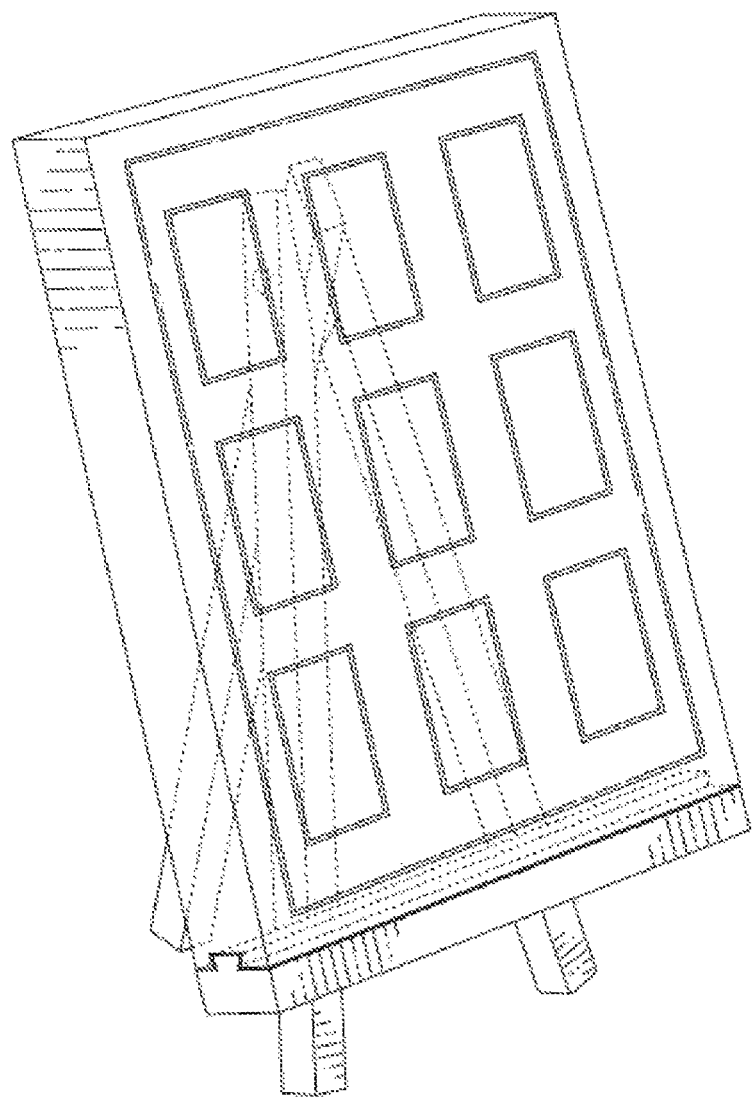

FIG. 15 depicts a front view of a game board supported on a three legged easel frame.

Figure 16:
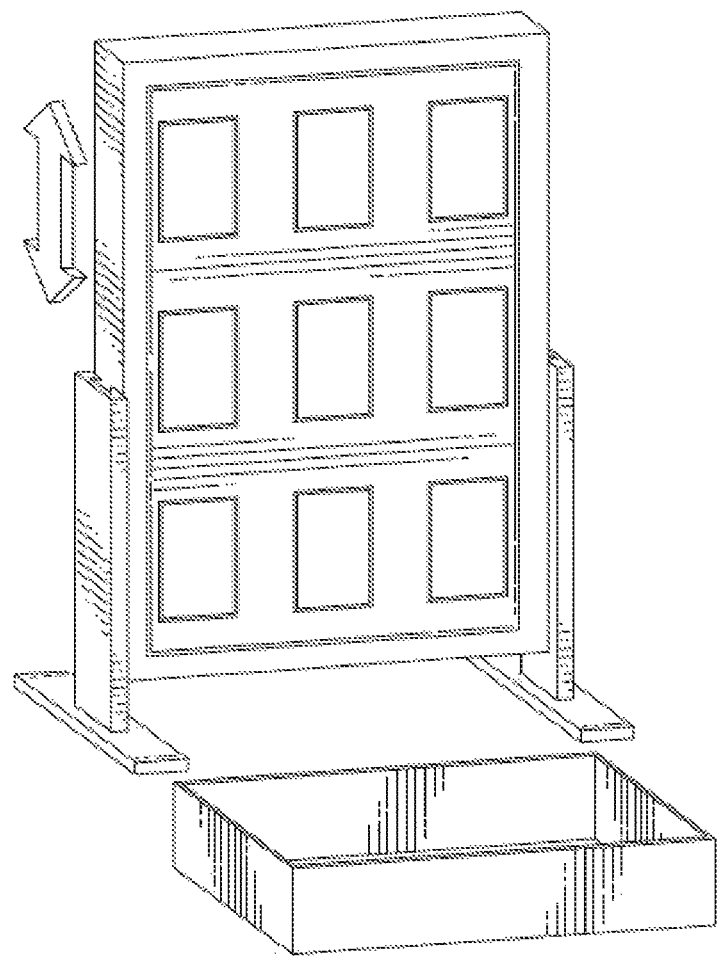

FIG. 16 depicts a front view of a game board and detached container box with removable legs from game board frame enabled by a notch and groove mechanism on the side panels of the game board frame.

Figure 17:
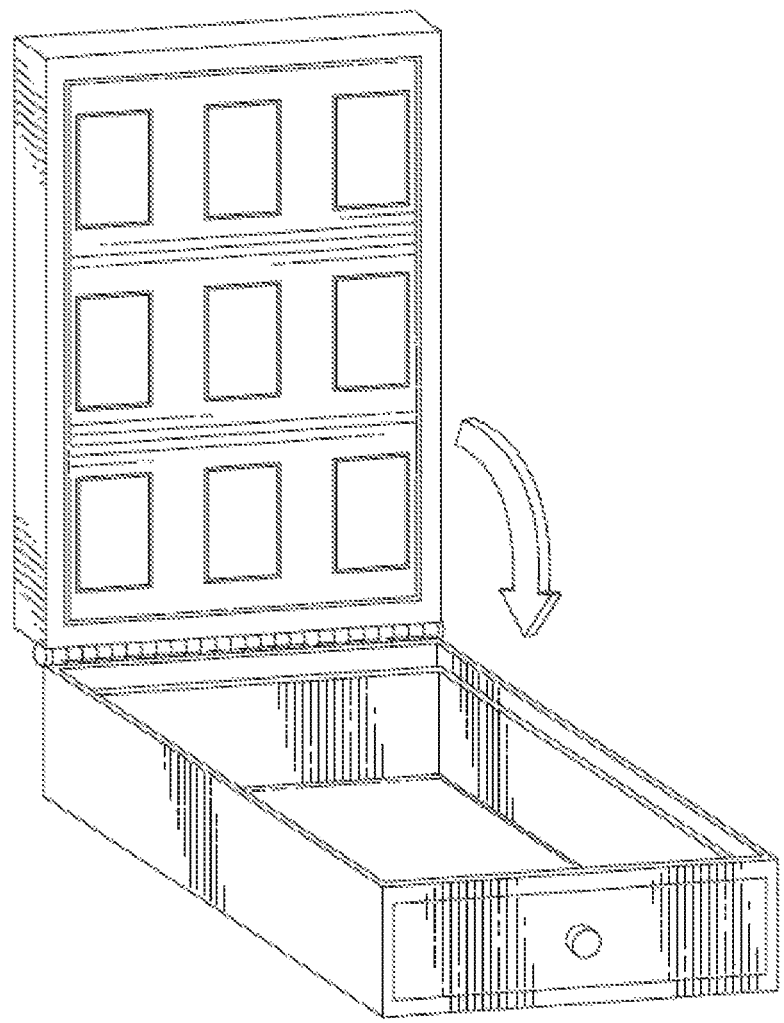

FIG. 17 depicts a rear view of a game board and an attached container box by way of a hinge, wherein the game board frame can close on the container box to form a lid, with an attached drawer for access to storage when the lid is closed.

DETAILED DESCRIPTION OF DRAWINGS

The present invention will be described in detail with reference to embodiments thereof as illustrated in the accompanying drawings and FIG. (s), in which like reference numerals are used to indicate identical or functionally similar elements. References to "one embodiment", "an embodiment", "an example embodiment", etc., indicate that the embodiment described may include a particular feature, structure, or characteristic, that every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following examples are illustrative, but not limiting, of the present invention. Other suitable modifications and adaptations of the variety of conditions and parameters normally encountered in the field, and which would be apparent to those skilled in the art, are within the spirit and scope of the invention.

Figure 1:
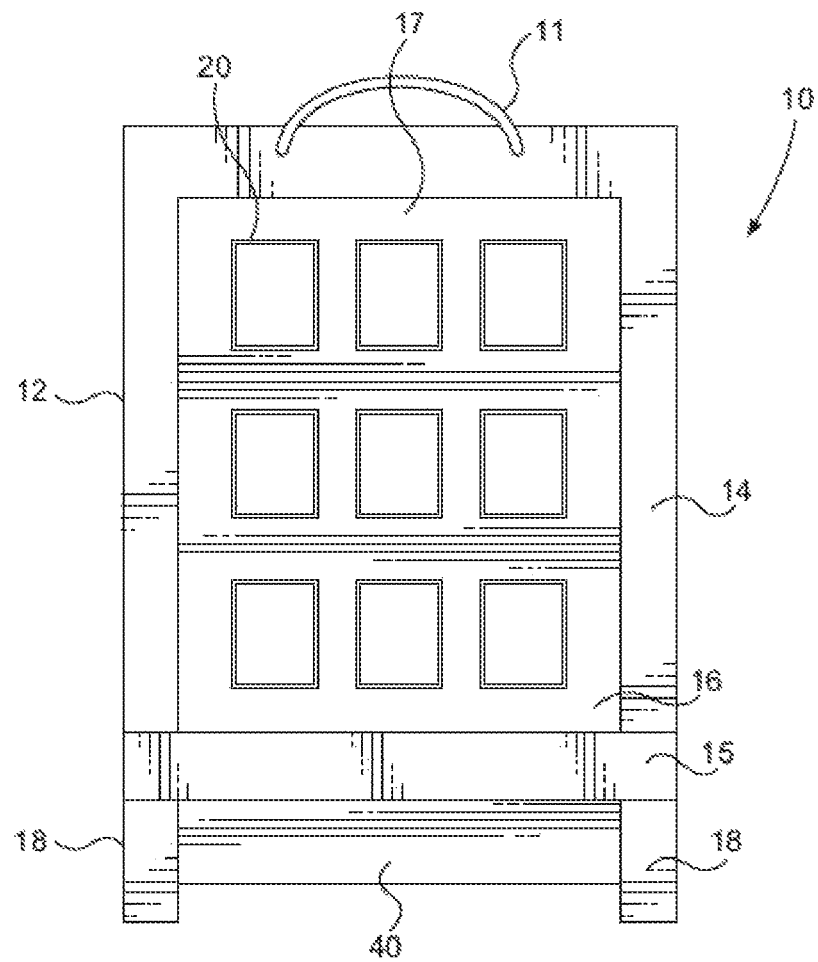
FIG. 1 depicts a front view of the game board component of the game invention providing a display means for the game cards.

Now referring to drawings in FIGS. 1-10, wherein similar components are identified by like reference numerals, there is seen in FIG. 1 a front view of a particularly certain embodiment of a game board component 12 of a game invention 10. A game board 12 provides a means to engage and display the plurality of game cards 24 (FIGS. 4 and 5) toward a group of players. A game board 12 generally comprises a rigid frame 14 surrounding a central panel portion 16. A frame 14 and panel 16 are supported by ancillary legs 18 as shown. A frame 14, panel 16, legs 18 and side panels 19 (FIGS. 3 and 8) are preferably constructed of a lightweight material such as wood, plastic or paper, to allow a game leader to easily position the board 12 on a table top or other display location. A handle 11 attached to the frame 14 supports this game invention 10 for carrying.

As shown the front surface 17 of the game board 12 includes a plurality of apertures 20 provided to operatively engage and display the game card components 24 of this game invention 10. In a certain embodiment the plurality of apertures 20 is nine and are arranged in a rows of three as shown. However, it must be noted that it is within the scope of the invention that the game board 12 may include any number of apertures 20 arranged in any disposition. A shelf component 15 attached to the frame 14 of this game board 12 can be used to hold writing utensils, pointers or the like. Below a board 12 is a container or box component 40 of this game invention 10 as will be shown in more detail in FIGS. 8 and 9 shortly.

Figure 2:
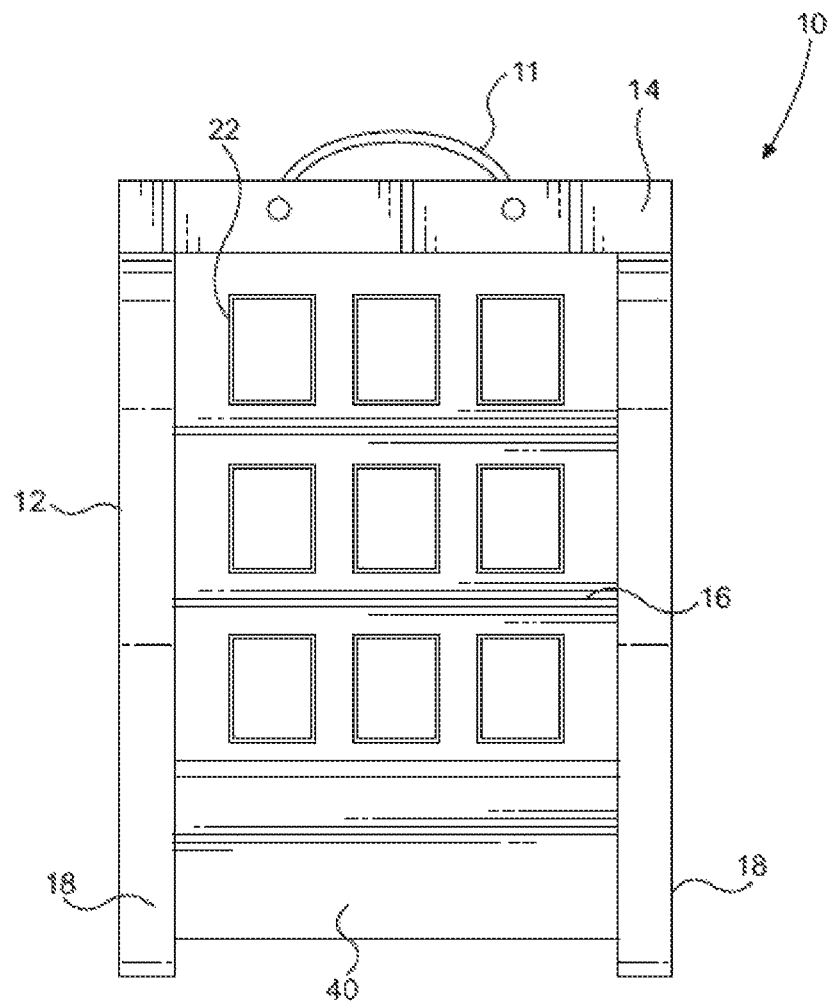
FIG. 2 depicts a rear view of the game board component of FIG. 1 showing slotted means for engaging game cards.
Figure 3:
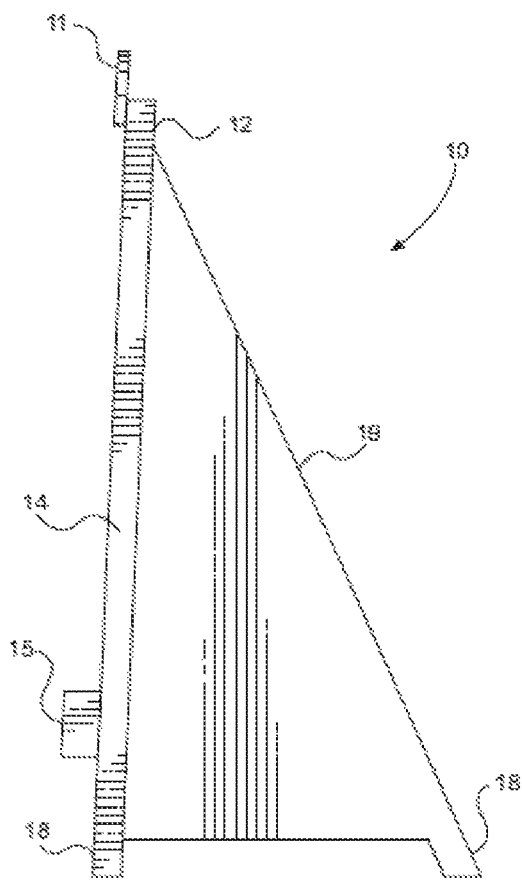
FIG. 3 depicts a side view of the game board component.

Shown in the rear view of FIG. 2, on the rear side of each aperture 20 is a slot 22 for receiving the game cards and operatively positioning the cards for display. In use, certain game cards are positioned into certain apertures 20 via the slots 22 such that the front surfaces of the game cards are viewable from the front surface 17 of the game board 12 as will be shown in more detail in FIGS. 6 and 7 shortly. The side view of FIG. 3 provides a view of the frame 14, shelf component 15, handle component 11, support legs 18 and side panel 19 of the game invention 10.

All game board embodiments may have a front and/or rear facing material construction similar to a white board or a plaque in varying sizes and widths to accommodate a user writing directly under said apertures to indicate various themes of instances of game play.

FIG. 4 depicts a view of a particular game card component 24 of the game invention 10. In general certain card fronts 26 include, but are not limited to, depictions or graphic illustrations or photographs of alphabet letters, numbers and counting, colors, shapes, sounds, sensory and tactile, opposites, emotions, faces, people, animals, toys, foods, structures, vehicles, clothing, home and family, school, doctor, farm, nature, city, what's missing or does not belong or any combination thereof, or other such learning theme to promote a dialog amongst the players. As shown in this example, a certain game card 24 having a front surface 26 depicts a graphic illustration 28 of a ball accompanied by alphanumeric characters 30 of the corresponding first letter of the illustration 28 depicted. During play, through identification of the card 24 by a player, the particular card 24 can be employed as a means to promote a dialog about the letter 'B' as well as the object 'ball' and the inherent association thereof.

It must be noted that the currently depicted card 24 is shown merely for demonstrative purposes of the intent of the invention and should not be considered limiting in any manner. Those skilled in the art will immediately recognize that the depictions, illustrations, or other indicia imparted on the card surfaces can be of any nature and theme related to learning, education, and development, and are anticipated.

Game cards 24 may be constructed of plastic, paper, wood, or any other suitable material. Further the illustration or other indicia can be imparted onto the card by any conventional means such as ink jet printing, silk screening, or the like. Game cards can depict the exact same image on the front and back of the card, in an embodiment wherein a single card can depict a yellow duck, or another image, on the front, and the same yellow duck will be depicted on the rear side of the card. Thus, the cards can be either dual-sided single image, dual-sided dual image with different images on each side, or cards may have questions written in text or other markings on the rear sides of game cards.

Shown further in FIG. 4B is a rear view of the particular card 24 of FIG. 4A showing the rear surface 32. As mentioned each card 24 is intended to illicit a dialog among the players to promote learning as well as fun. As players choose a card 24 displayed on the game board 12 the game leader then proceeds to start the dialog by asking questions or telling a story. In a certain embodiment the questions and dialog may be up to the game leader's discretion, however in another embodiment discussion questions can be provided through a list of questions 34 printed or otherwise formed on the rear surface 32 of the cards 24 as shown in the figure. Various questions 34 may be specifically directed towards the illustration on the front surface 26 of the card 24 the questions 34 can be of a general set of questions to merely provide a guide for the game leader.

Further, in yet other game embodiments, questions may be included with the game on a separate sheet such as an instruction sheet. In this mode as shown in FIG. 4C, the rear surface 32 of the card 24 may instead include, but is not limited to, another graphic illustrations or photographs 29 (as an example there is shown a mom and baby fish) of alphabet letters, numbers and counting, colors, shapes, sounds, sensory/tactile, opposites, emotions, faces, people, animals, toys, foods, structures, vehicles, clothing, home and family, school, doctor, farm, nature, city, what's missing or doesn't belong, or any combination thereof such that the card 24 is reversible during play.

FIG. 5A shows a view of yet another example of a particular game card component 24 of the invention. In this example the front surface 26 shows an illustration 28 of a house. The game leader may then ask question about the shape or form of the house, how to spell the word house, or other instructional type of question. Again, as shown in FIG. 5(*b*), the rear surface 32 of the card 24 may include a list of printed questions 34 as needed. However, as noted previously, it is within the scope of this invention that the rear surface 32 may instead include a graphic depiction or illustration such that the card 24 is reversible during play.

Still further, in the current example shown, the particular card 24 includes an indication 36 that the card 24 is a designated as a Surprise card. As mentioned previously, prior to game play, the game leader had instructed the players that one or a plurality of the game cards 24 are designated as a surprise card wherein if chosen, the players will receive a surprise reward. The game leader may choose the surprise cards at their discretion or the game cards 24 can be provided with pre chosen surprise cards through the provision of an indication 36. In another certain embodiment the surprise reward is intended to elicit laughter from the players, providing a fun element to the game, and can be accomplished via the game leader donning face paint, a funny face, or puppet 44 provided (FIG. 9). Again, it is noted that in other embodiments of this present invention such an indication 36 may not be present and instead the Surprise card is chosen at the game leader's discretion.

FIG. 6 and FIG. 7 depict an embodiment of this present invention 10 wherein a game card 24 is positioned within the slot 22 on the rear surface of a game board 12 such that the front surface 26 of the game card 26 is displayed through the respective aperture 20 on the front surface 17 of a game board 12. It must be noted that in this embodiment it is particularly preferred that each aperture 20 includes a different game card 24 engaged thereon such that the players can pick and choose what card to discuss through each turn of play in effort to hopefully pick the designated Surprise card or cards.

FIG. 8 shows a ¾ perspective view of this game invention 10 showing a container or box component 40 and side panels 19 of this game device and apparatus.

FIG. 9 depicts an example of possible surprise elements of which the game leader can choose to integrate into a certain game. In this mode and embodiment, a container or box 40 is provided and is employed to contain a plurality of surprise elements, such as but not limited to a nose 42, puppet 44, glasses 46, headband 48 or other item suitable for the intended purpose. When a Surprise card is chosen, a game leader preferably proceeds to hide or duck behind the game board 12 and out of the sight of the players, dons the desired surprise element, and then provides a funny or theatrical performance to the players.

This is both entertaining and provides a reward for engaging in learning discussion and/or answering the questions provided. It should be further noted that for infants, hiding behind a game board and popping out (while saying 'peek-a-boo' or other phrase) may be enough to elicit laughter, thus, donning a costume is to be considered optional. A container or box 40 of this game invention 10 is also intended to hold a plurality of game cards 24.

FIG. 10 illustrates a side view of a particularly preferred lid component 50 to the container or box 40 of this game device and apparatus. Said lid may be constructed of the same material as the container box or may be constructed of another substance for translucency or comfort of movement to access the game cards.

FIG. 11 illustrates an embodiment of the game board that will allow for streamline storage of a game board frame. In so much as the side panels and legs articulate with the frame with a lateral hinge running the length of the board or at various point along the vertical axis of the game board. Side hinges allow for leg panels to swing inward in a parallel manner to the game board. Additionally, the container box attached to the game board attaches in a manner to allow user to collapse the container box on to the game board frame. Side panels act as a securing mechanism to keep the container box flush against the game board. A certain embodiment also contains a carrying handle attached to the upper-most horizontal panel of a game board to facilitate ease of transport for the user. FIG. 12 depicts a rear view of a game board and container box in its collapsed mode for storage and/or transport pursuant to the mechanism described.

FIG. 13 illustrates a static embodiment of the game board wherein the leg panels and container box have a construction that will not allow movement of a collapse of any panels. This embodiment provides for a very firm and stable construction for the user to play the game. FIG. 13 also depicts the white board plaques directly under the game card apertures to enable a user to write a note or theme or other various markings directly under a chosen aperture.

FIG. 14 reflects another embodiment with a detached container box to house the game cards and other material, but with adjustable legs attached to the game board frame which will enable different angles of operation of the game board frame.

FIG. 15 illustrates another embodiment of single unit game board resting on a tripod base which resembles an easel. This embodiment may be secured to the easel foundation via a notch and groove construct within the lower most horizontal panel of the game board, which will make a game board and the easel foundation a single secure unit to enable game play. Further variation on this embodiment does not contain the notch and groove mechanism, wherein a game board rests on the easel for ease of use and transport.

FIG. 16 reflects an embodiment of a game board that utilizes unique removable side panels and legs. A game board may slide in and out of a leg and panel apparatus via a notch and groove mechanism to detach the legs fully from the game board by a vertical slide out option. This embodiment enables a game board to flatten without necessitating hinges.

FIG. 17 illustrates another embodiment of a single unit game board and an attached container box. The articulation point is a horizontal hinge attached to the upper portion of the container box and the lower most horizontal panel of a game board. This horizontal hinge enables a game board to be the attach lid for a container box when the hinge is activated and the game board lowers on to a container box. Additionally, this embodiment allows for a drawer on the side of the container box to allow for access to the game cards and materials when a game board is in the closed position.

As an illustrative example of game play for the present invention, the following is a step by step flow of a game with an adult leader and a child player of approximately two years old:

A game board is set up for operation for the game. The accessories and puppet are loaded into a game box ("box"). Game cards ("cards") and instructions/questions cards are next to the board.

Leader secretly designates a card or a plurality of cards to be the "surprise" card(s).

Leader may opt to mark the card or the rear side of the board; alternatively, leader may choose the surprise card(s) at his or her discretion.

Game begins with the game leader ("leader") saying: "Hi, [child's name] would you like to play a game?"

Child says: "Yes!"

Leader chooses the cards, or asks the child to choose the cards he or she would like to use.

Leader and/or child loads the cards into the slots.

Leader tells the child that behind one of the cards is a surprise.

Leader asks the child to help him or her find the surprise.

Leader says: "Maybe the surprise is behind the ball. Is this a ball? Leader points to a card depicting a dog. (Leader may employ a pen or stylus to point at the images.)

Child says: "No. That's a dog."

Leader says, "Oh, silly me." Is this the ball? Leader points to a card depicting a shoe.

Child says: "That's a shoe!"

Leader says: "Where is the ball?"

Child points to the card depicting the ball.

Leader says: "You're right. That is a ball. Let me see if the surprise is behind the ball."

Leader hides his or her face behind the board and "checks" behind the card depicting the ball.

Leader pops out from behind the board so child can see his or her face again.

Leader says: "No, it's not there. Maybe the surprise is behind the cake. Can you find the cake?"

Child points to the card depicting the cake.

Leader asks: "How many candles are on the cake?"

Child says: "Two."

Leader says: "Yes, there are two candles on the cake. Would you like to help me blow them out?"

Leader and child pretend to blow out the candles.

Leader asks: "What color is the cake?"

Child says: "poopie"

Child laughs. Leader laughs.

Leader says: "That's right. The cake is brown."

Leader says: "Hmm, let me see if the surprise is behind the cake."

Leader hides his or her face behind the board, retrieves a funny nose from the box and dons it.

Leader pops up from the top of the board so as to be seen by child wearing the nose, and says "Peek-a-Boo."

Child laughs. Child asks to play another round.

Leader asks: "Can you point to something that makes a sound?"

Child points to the card depicting a cow.

Leader asks: "Does the cow say oink?"

Child laughs.

Leader asks, "What about quack. Does the cow say quack?"

Child laughs and says "Moo."

Leader says: "Let's practice mooing together."

Child and leader practice mooing.

Leader hides his or her face and "checks" behind the board. Leader shows his or her face again.

Leader says: "There's no surprise behind the cow. Which card do you think the surprise is behind?"

Child says: "Baby"

Leader "checks" behind the board and the card depicting the baby and dons funny eyeglasses. Leader reveals his or her face wearing the eyeglasses from one of the sides of the board.

Child laughs. Child asks to wear the nose and glasses.

Leader says: "You can wear the nose and glasses while we keep playing." (Leader may reverse or swap cards at any time during the game)

Leader points to a card depicting balloons and asks "What are these?"

Child says: "Balloons"

Leader asks: "How many balloons are there?"

Child shrugs.

Leader says: "I know someone who can help us count balloons."

Leader retrieves a hand puppet from the box. He or she dons the puppet and pops the puppet up from the top of the board.
Leader introduces puppet to child.
Leader via the puppet says: "Let's count the balloons together."
Leader helps child count ten balloons.
Leader asks: "What shape are the balloons?"
Child uses his or her arms to make a round circle.
Leader says: "Where do we find balloons?"
Child says: "Circus."
Leader asks: "I think there may be a surprise hiding behind a circus animal. Can you find a circus animal for me?
Child points to the card depicting a tiger.
Leader asks: "Can you say "tiger" with me? Leader spells T-I-G-E-R.
Leader asks: What about a chicken. Are there chickens at the circus?"
Child says "no."
Leader asks: "Where do you find chickens?"
Child says: "farm"
Leader says: "Let me see if the surprise is behind the tiger."
Leader once again "checks' behind the board and the card in question. Leader may don another accessory or accessories, or opt to have the puppet don an accessory.
Leader gives the child one last peek-a-boo surprise.
Leader says: Bye [child's name], it's time for the game to end. Thank you for playing with me."
Child says "Play More!"

The fundamental characteristics and features of this invention have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention.

Consequently, all such modifications and variations and substitutions are included within the scope of the invention as defined by the following claims.

I claim:
1. A learning game apparatus comprising:
a plurality of game cards having front and rear sides;
a game board comprising a rigid frame having a plurality of card slots that enable the game cards to attach or slide into the card slots;
wherein the game board frame comprises side panels and legs to support a free-standing method of operation for a game;
wherein the game board frame is constructed of lightweight but rigid material for durable use with children;
wherein the game board frame comprises a handle attached at the top of the frame;
wherein the game board frame comprises a plurality of front and rear apertures configured to allow front and rear views of game cards attached to the game board;
wherein the game board frame comprises white board plaques directly under the front and/or rear apertures to facilitate writing notes or game indicators on the game board; and
wherein the game board frame comprises an attached container box to store and hold elements and materials of the game.

2. The learning game apparatus as claimed in claim 1, wherein the game board frame comprises hinges to allow the legs, side panels and container box to fold into a flat profile.

3. The learning game apparatus as claimed in claim 1, wherein the game board frame comprises a notch and groove mechanism to allow the legs, side panels and container box to be disassembled to fold into a flat profile.

4. The learning game apparatus as claimed in claim 1, wherein the game board is illustrated with graphics and artistic work to be aesthetically pleasing to users and game players.

5. The learning game apparatus as claimed in claim 1, wherein the legs and panels are static.

6. The learning game apparatus as claimed in claim 1, wherein the legs are adjustable to vary the angle of the game board.

7. The learning game apparatus as claimed in claim 1, wherein the game board frame articulates with a tripod or easel via a notch and groove mechanism within the lowermost horizontal panel of the game board.

8. The learning game apparatus as claimed in claim 1, wherein the game board frame articulates with a tripod or easel without an attached notch and groove mechanism to rest on the easel to facilitate game play.

9. The learning game apparatus as claimed in claim 1, wherein the game board frame is attached to the container box by way of a hinge, wherein the game board frame is configured to close on the container box to form a lid, with an attached drawer for access to storage when the lid is closed.

10. The learning game apparatus as claimed in claim 1, wherein the game board frame is attached to the container box by way of a notch and groove mechanism, wherein the game board frame is configured to close on the container box to form a lid, with an attached drawer for access to storage when the lid is closed.

11. The learning game apparatus as claimed in claim 1, wherein the game cards comprise cards which depict the same image on the front and rear sides.

12. The learning game apparatus as claimed in claim 1, wherein the game cards comprise cards which depict different images on the front and rear sides.

13. The learning game apparatus as claimed in claim 1, wherein the game cards comprise cards which depict text of questions on the rear side.

\* \* \* \* \*